United States Patent [19]

Chrysos et al.

[11] Patent Number: 6,108,770

[45] Date of Patent: Aug. 22, 2000

[54] METHOD AND APPARATUS FOR PREDICTING MEMORY DEPENDENCE USING STORE SETS

[75] Inventors: George Z. Chrysos, Marlboro; Joel S. Emer, Acton; Bruce E. Edwards, Belmont; John H. Edmondson, Arlington, all of Mass.

[73] Assignee: Digital Equipment Corporation, Houston, Tex.

[21] Appl. No.: 09/103,984

[22] Filed: Jun. 24, 1998

[51] Int. Cl.[7] ........................................................ G06F 9/38
[52] U.S. Cl. ............................................................. 712/216
[58] Field of Search ..................................... 712/216, 217, 712/218, 219

[56] References Cited

U.S. PATENT DOCUMENTS

| | | |
|---|---|---|
| 5,509,135 | 4/1996 | Steely, Jr. . |
| 5,615,350 | 3/1997 | Hesson et al. . |
| 5,781,752 | 7/1998 | Moshovos et al. ............... 712/216 |
| 5,987,595 | 11/1999 | Yoaz et al. ....................... 712/216 |

OTHER PUBLICATIONS

Tyson, G.S., and Austin, T.M., "Improving the Accuracy and Performance of Memory Communication Through Renaming," Proc. 30th Annual IEEE/ACM International Symposium on Microarchitecture, pp. 218–227 (Dec. 1–3, 1997).

Moshovos, A. et al., "Dynamic Speculation and Synchronization of Data Dependences," Proc. 24th Annual International Symposium on Computer Architecture, consisting of 13 pages (1997).

Moshovos, A. et al., "Streamlining Inter-operation Memory Communication via Data Dependence Prediction," Proc. Micro-30, consisting of 11 pages (Dec. 1–3, 1997).

*Primary Examiner*—William M. Treat
*Attorney, Agent, or Firm*—Hamilton, Brook, Smith & Reynolds, P.C.

[57] ABSTRACT

A method of scheduling program instructions for execution in a computer processor comprises fetching and holding instructions from an instruction memory and executing the fetched instructions out of program order. When load/store order violations are detected, the effects of the load operation and its dependent instructions are erased and they are re-executed. The load is associated with all stores on whose data the load depends. This collection of stores is called a store set. On a subsequent issuance of the load, its execution is delayed until any store in the load's store set has issued. Two loads may share a store set, and separate store sets are merged when a load from one store set is found to depend on a store from another store set. A preferred embodiment employs two tables. The first is a store set ID table (SSIT) which is indexed by part of, or a hash of, an instruction PC. Entries in the SSIT provide a store set ID which is used to index into the second table, which for each store set, contains a pointer to the last fetched, unexecuted store instruction.

39 Claims, 6 Drawing Sheets

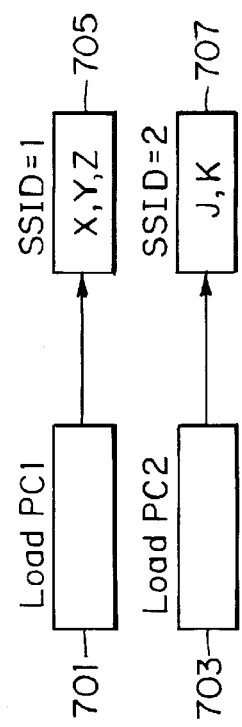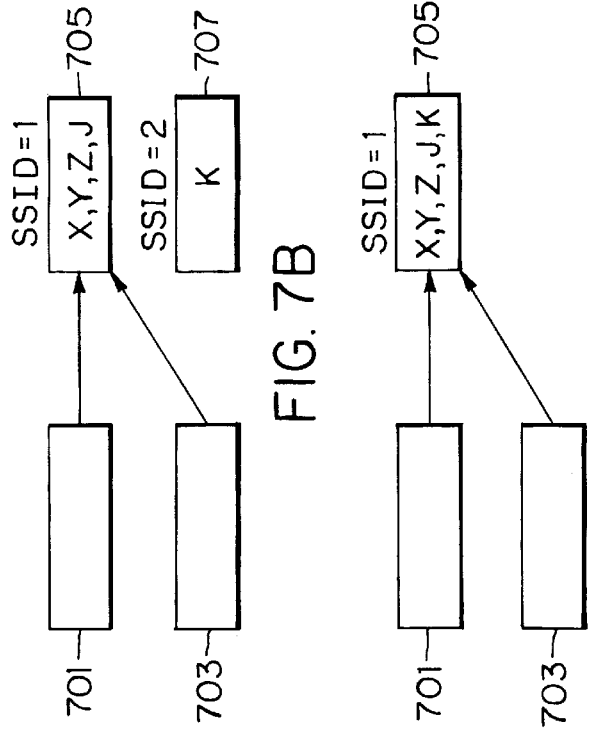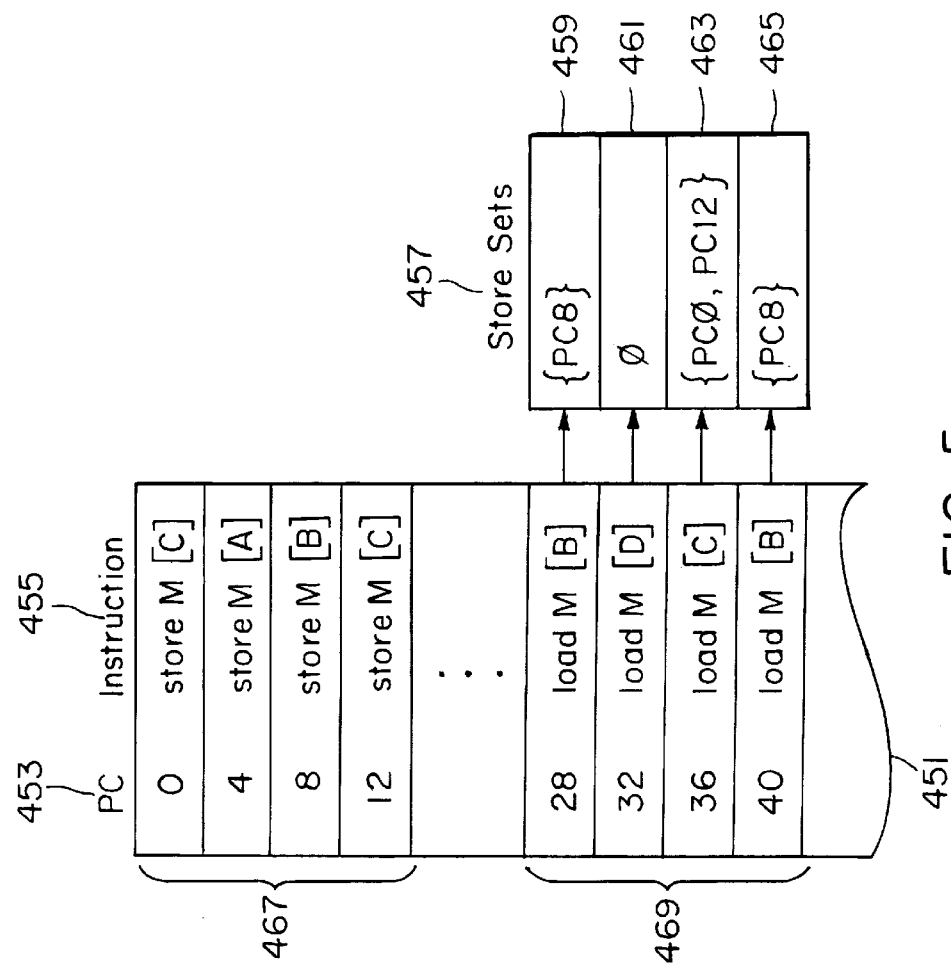

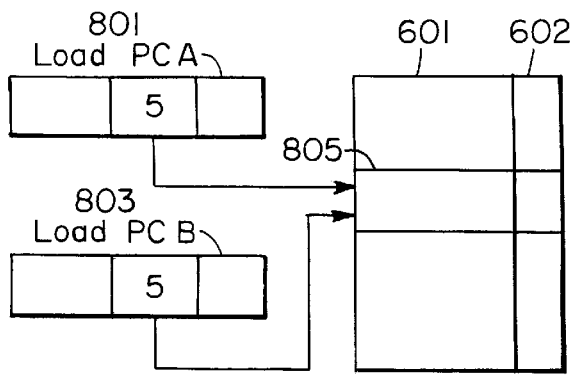
FIG. 8
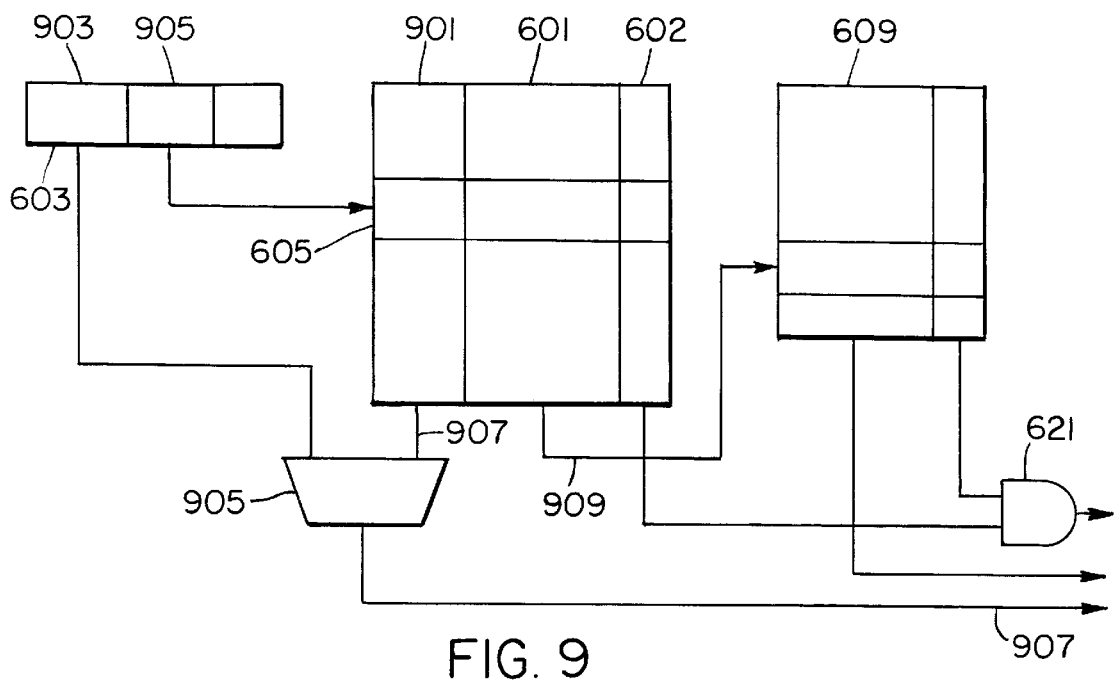
FIG. 9
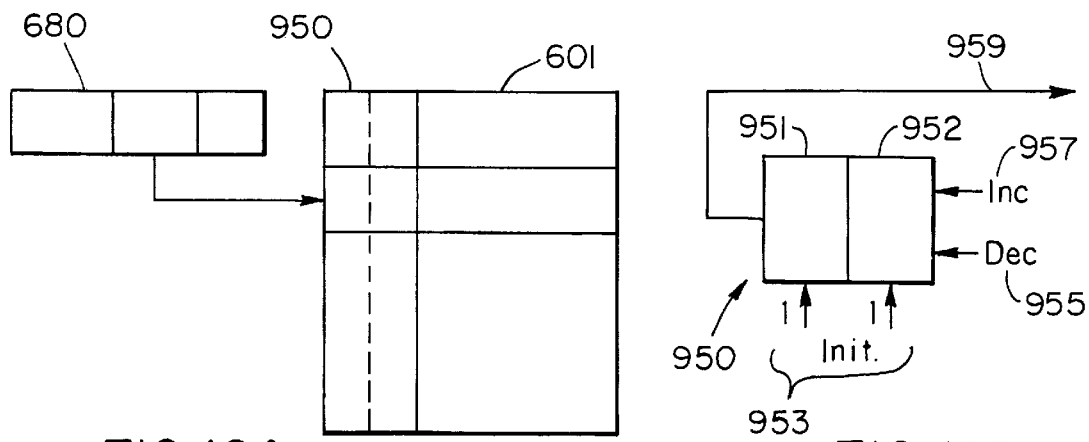
FIG. 10A
FIG. 10B

METHOD AND APPARATUS FOR PREDICTING MEMORY DEPENDENCE USING STORE SETS

BACKGROUND OF THE INVENTION

Generally, a computer program is an ordered set or sequence of instructions to be processed, or executed, by a computer processor. The processor fetches the program instructions and executes them. Normally, instructions are fetched sequentially, with breaks in the sequence occurring when a branch or jump instruction is encountered. The order in which the instructions are fetches is the program order.

Many modern microprocessors allow instructions to execute out of order. In particular, instructions are executed from a set of already fetched instructions, out of program order, but still require certain dependencies, such as register and memory dependencies, to be preserved. A register dependency results from an ordered pair of instructions where the later instruction needs a register value produced by the earlier instruction. A memory dependency results from an ordered pair of memory instructions where the later instruction reads a value stored in memory by the earlier instruction.

Thus, on the one hand, the out-of-order execution of instructions improved performance because it allows more instructions to complete in the same amount of time by efficiently executing independent operations. However, problems may occur when executing load and store instructions out-of-order.

The terms load, load instruction and load operation instruction are used herein interchangeably and refer to instructions which cause data to be loaded, or read, from memory. This includes the usual load instructions, as well as move, compare, add, and so on where these instructions require the reading of data from memory. Similarly, store, store instruction and store operation instruction are used interchangeably and refer to instructions which cause data to be written to memory.

When a load instruction executes before an older, i.e., earlier fetched, store instruction referencing the same address, the load may retrieve an incorrect value because the data the load should use has not yet been stored at the address by the store instruction. Hardware detects this memory dependency violation, and squashes the load instruction and its subsequent dependent instructions, i.e. these instructions are ignored and must be re-executed (replayed). Because valuable time and resources have been wasted, such hardware recovery degrades processor performance.

Memory reference tagging stores have been proposed in which information from prior memory order violations is used to product subsequent memory dependencies, and consequently to prevent reordering of certain instructions as appropriate. This general method is described in U.S. Pat. No. 5,619,662 (Steely), "Memory Reference Tagging", dated Apr. 8, 1997 (hereinafter '662 patent), and incorporated herein by this reference in the entirety.

The '662 patent describes a means of detecting dependent load and store instructions which have executed out of order, by using a write buffer to keep track of executed load and store instructions until it is determined whether or not they have executed in their proper order. Four different approaches to having such detection of an out-of-order execution are described. In the first, part of the referenced (or target) memory address is used as a tag to be associated with each of the out-of-order instructions. If these instructions layer appear again in the instruction queue, the fact that they have identical tags will cause them to be issued in program order.

The second approach uses an assigned "problem number" as a tag. Two instruction referencing the same memory address and with the same problem number are not re-ordered.

The third approach simply associates a tag bit with an instruction to indicate that other memory reference instructions should not be re-ordered around the tagged instruction.

Finally, the fourth approach turns off reordering for some number of instructions when entering a subroutine.

U.S. Pat. No. 5,615,350 (Hesson), "Apparatus to Dynamically Control the Out-of-Order Execution of Load-Store Instructions in a Processor Capable of Dispatching, Issuing and Executing Multiple Instructions in a Single Processor Cycle," issued Mar. 25, 1997, teaches a store barrier cache for constraining the reordering of loads and stores to reduce memory order violations. A store barrier cache keeps track of stores that tend to cause memory-order violations. The cache is accessed in parallel with the instruction cache, and is notified when a memory-order violation occurs. The store causing the violation is noted in the store carrier cache as problematic. The next time the store is fetched, the processor inhibits all subsequent loads from executing until that store executes. However, processor performance in large machines still suffers because loads which will not cause memory order violations are often prohibited from executing as early as possible, reducing the processor's efficiency.

Moshovos et al., in "Dynamic Speculation and Synchronization of Data Dependence", CS Department, University of Wisconsin-Madison, refines the goals for memory dependence prediction: not only should loads be delayed when necessary to avoid memory-order violations, they should also be released as soon as possible when they can safely execute. Their solution is a set of small, fully-associative tables which hold load/store pairs that have caused memory-order violations in the past, and which are used to synchronize the execution of the two instructions to avoid more violations in the future. However, when the table size is limited to reasonable hardware constraints, there is significantly less performance than an oracle (perfect) memory dependence predictor would provide. In addition, the tables are complex and cumbersome to generate and maintain, and are slow to access.

Moshovos et al. continued their work in "Streamlining Inter-operation Memory Communication via Data Dependence Prediction", MICRO-30, December, 1997, and extended it to using memory dependence prediction to reduce load latency. They do this by a mechanism they call memory cloaking in which a load/store pair has an identifier that is used to bypass the store's data value directly to the consumers of the load. As such, this solution involves the passing of data to the consumer which is typically beyond an instruction scheduler.

Tyson and Austin, "Improving the Accuracy and Performance of Memory Communication through Renaming", MICRO-30, December, 1997, suggest that the memory trap penalty can be effectively reduced by re-executing only the load instruction and its tree of dependent instructions, without affecting other instructions fetched after the load but which are not dependent on it. They combine memory dependency prediction and load value prediction to directly satisfy load instructions without having to access the cache.

Another solution to the problem of reordering dependent load instructions is to remember recently squashed loads, and to force those loads to wait for all prior stores the next time they are fetches.

SUMMARY OF THE INVENTION

Some of the above approaches suffer a performance degradation because loads are delayed longer than necessary.

The goals of memory dependence prediction are 1) to predict which load instructions, if allowed to execute, would violate a true data dependence and 2) to delay the execution of these loads only as long as is necessary to avoid a memory-order violation. When a memory dependence predictor makes a mistake, it fails one of these two goals.

The memory dependence predictors described by Hesson and Steely do not address certain memory dependence characteristics found in some programs, which can complicate prediction. In particular, a memory dependence predictor needs to handle cases where a load depends on multiple stores or a store has multiple loads that depend on it.

The present invention uses a predictor that addresses these types of memory dependencies, based on the concept of a store set for use in memory dependence prediction. Each load operation instruction, or load, in a program has a specific set of store operation instructions, or stores, upon which it depends. These stores are determined by first allowing loads and stores to execute speculatively out of order, causing memory order violations. Each store which causes a memory order violation with a load is added to the load's store set. The store set is then used to predict which stores a load must wait for before executing.

While Tyson and Austin's approach should significantly reduce the memory trap penalties, designing a processor to be able to re-execute only the dependent instructions may be difficult. The present invention reduces the memory trap rate to negligible amounts, making the memory trap penalty relatively unimportant.

The intent in Hesson is to reduce memory-order violations by enforcing strict ordering around stores which tend to conflict with nearby loads, effectively creating store barriers. The weakness of this approach is that many loads which do not depend on the store barriers are unnecessarily delayed. These false dependencies degrade performance.

The present invention focuses on program behavior that tends to reduce memory dependence prediction accuracy. As different paths of code are executed, a single load instruction can become dependent on multiple store instructions. In addition, multiple load instructions can be dependent on the same store. In order to achieve nearly optimal performance, a memory dependence predictor must handle these cases.

Accordingly, a method of scheduling program instructions for execution in a computer processor comprises fetching and holding instructions from an instruction memory. Some of the fetches instructions are loads including any instructions which cause load operations. Other fetches instructions are stores, including any instructions which cause store operations.

The fetched instructions are issued out of program order. A load/store order violation occurs when a load executes prior to a store on whose data the load depends. On such an occurrence, the effects of the load operation and its dependent instructions are undone and the instructions are re-executed. The load is then associated with the store on whose data the load depends.

Finally, on a later fetch of the load instruction, its execution is delayed until after the execution of any previously-fetched store instruction which has been associated with the load instruction.

In a preferred embodiment, all load and store instructions among which dependencies are detected are grouped together into a store set.

When a subsequent load/store order violation is detected and the store already belongs to some store set, the load is added to that store set if the load does not already have its own store set. If the load does have a non-empty store set, its store set is merged with the store set to which the store belongs.

In a preferred embodiment, merging occurs gradually by moving one load or store to the other's store set when a violation occurs. At each violation involving two store sets, one of the store sets is declared a winner. The load or store which is in the losing store set is removed from the losing store set and added to the winning store set. In a preferred embodiment, every store set is assigned a unique store set identifier (SSID), and a numerical comparison of SSIDs is used to declare the winner. For example, the store set with the lower SSID may be declared the winner.

Alternatively, the store set with fewer instructions is declared the winner.

In a preferred embodiment, stores within a store set must execute in fetched order. In a further embodiment, both stores and loads within a store set must execute in fetched order. The important point is that stores precede the load on which they depend.

A preferred embodiment utilizes a Store Set Identifier Table (SSIT) for storing store set identifiers (SSIDs). The SSIT is indexed by respective load and store instruction program counters (PCs). The index for the SSIT may comprise part of an instruction PC, including a hash of a part of the instruction PC.

A Last Fetched Store Table (LFST) holds an instruction identifier for each store set and is indexed by the SSIDs associated in the SSIT with the perspective load and store instructions. Each instruction identifier references the most recently fetched store instruction from the store set identified by the respective SSID. Execution of any load or store instruction under consideration is delayed if the instruction is associated with a store set whose respective entry in the LFST refers to a store instruction which has not yet executed.

Eventually, the instruction under consideration is executed after the store instruction, identified in the LFST at the time the instruction under consideration accessed the LFST, is executed.

In a preferred embodiment, SSIT entries are intermittently, or alternatively, cyclically, invalidated.

In a further embodiment, a tag portion of a load or store PC is saved in the SSIT, such that when the load or store is later fetched, its tag portion is compared with the tag retrieved from the SSIT, and if they match, the corresponding SSID in the SSIT if valid. Thus, instructions having matching indexes but not belonging to the same store set are not forced to wait needlessly for instructions on which they do not depend.

In yet another embodiment, a counter, preferably a 2-bit counter, is associated with each SSIT entry. Each counter is set to a predetermined value, preferably its maximum value, when a load/store violation occurs involving the store instruction associated with the SSIT entry. If it is determined that a real dependence does not exist on a subsequent non-reordered issuance of the store instruction, the associated counter is decremented. Otherwise the counter is incremented. If the counter's value is less than some threshold, the associated store is removed from the load instruction's store set. Real dependence is determined by comparing the two instructions' memory-reference (target) addresses after both have executed.

Finally, yet another embodiment of the present invention represents setoff items in a direct-mapped table, by associating an item with a set. If no appropriate set already exists, a new set is created for the item, and the item is associated with the new set. A unique set identifier (SID) is assigned to each set. SIDs are then stored in a table at locations indexed by an index which is based on the item.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a schematic diagram illustrating dependent loads and stores in an instruction stream, with the associated store sets of the present invention.

FIGS. 7A–7C are schematic diagrams illustrating the merging technique of the present invention.

FIG. 8 is a schematic diagram illustrating how unrelated loads with the same index point to the same table entry in the present invention.

FIG. 9 is a schematic diagram of a preferred embodiment of the present invention using tags.

FIGS. 10A and 10B are schematic diagrams of a 2-bit counter used in a preferred embodiment of the present invention to invalidate table entries.

DETAILED DESCRIPTION OF THE INVENTION

Figure 1:
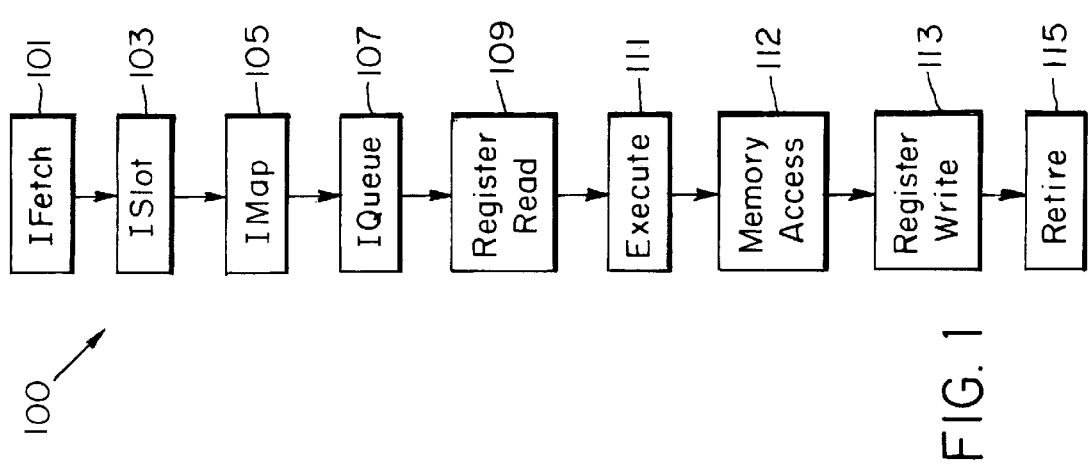
FIG. 1 is a block diagram showing the typical stages of a processor's instruction pipeline.

FIG. 1 shows the various stages of a typical instruction pipeline 100. In step 101, one or more instructions are fetched, typically from an instruction cache. Next, in step 103, the instructions are decoded. In step 105, architectural registers named in the instructions are mapped to physical registers. Instruction identifiers are assigned to instructions during this stage.

In step 107, instructions are written into the instruction queue. The instruction queue decides which instructions are to issue based on available resources such as registers and execution units, and on register dependencies, and re-orders the instructions accordingly, assigning the issuing instructions to execution units.

Next, in step 109, any registers are read as required by the issued instructions. In step 111, the instructions are executed. Any memory references which must be derived are calculated during this stage. Step 112 is the memory access stage in which memory addresses derived in step 111 are accessed. In step 113, data is written into the registers. Finally, in step 115, instructions are "retired".

Figure 2:
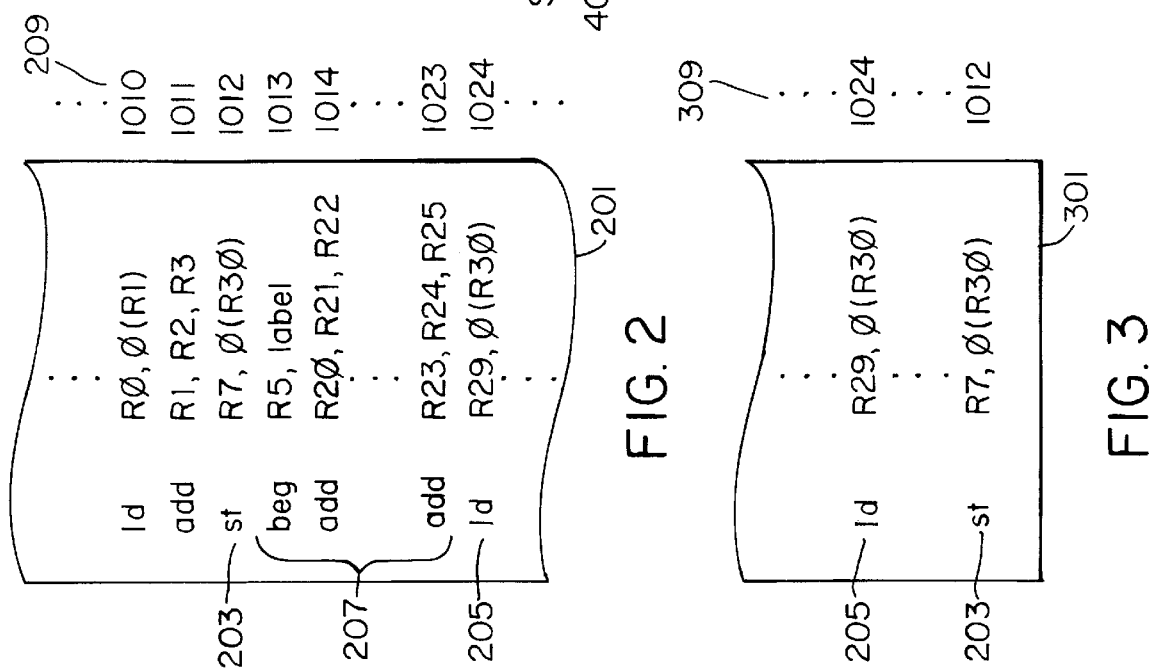
FIG. 2 is a schematic diagram showing an instruction stream as it enters the instruction queue of FIG. 1.

FIG. 2 shows an instruction stream 201 as it enters the instruction queue 107 (FIG. 1). Instructions are placed in the queue in the order in which they are encountered in the stream 201. The instruction labeled 203, "st R7,0(R30)" is a store instruction. When it is executed at stage 111 of FIG. 1, the data in register R7 is stored in a target memory location whose address is the sum of 0 and the contents held in register R30. This target address must be computed during the execution stage 111 of the instruction pipeline 100.

The instruction labeled 205, "ld R29,0(R30)" is a load instruction. When it is executed at stage 111 in FIG. 1, the memory location is referenced whose address is again the sum of 0 and the contents held in register R30, and the data held in this referenced memory location is loaded into register R29. Other instructions 207 may be fetched between store instruction 203 and load instruction 205, and of course, additional instructions 208 may be fetched after instruction 205. When the value held by register R30 is the same for both instructions 203, 205, the load instruction 205 is dependent on the store instruction 203 because the load instruction 205 needs to read the data stored in memory by the store instruction 203.

As instructions from stream 201 enter the queue 107, they are assigned instruction identifiers 209, here shown in decimal form. Specifically, a value of 1012 has been assigned as the instruction identifier to the store instruction 203, and a value of 1024 has been assigned as the instruction identifier to the load instruction 205.

Figure 3:
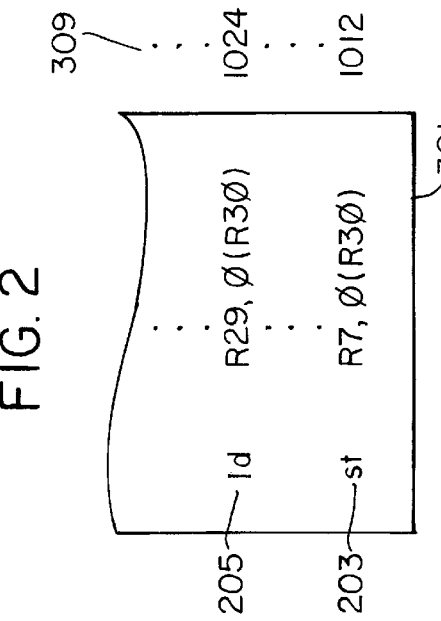
FIG. 3 is a schematic diagram illustrating a re-ordered execution order of the instruction stream of FIG. 2.

As stated above, depending on available resources and register dependencies, instructions are issued out-of-order from the instruction queue 107. An execution order of instructions 301 is depicted in FIG. 3. Here the load 205 and store 203 instructions have executed out of program order. This could be, for example, because register R7 is not yet available to the store instruction 203. In any event, if register R30 contains the same value for both instructions 203, 205, the load instruction 205 will potentially be reading in the wrong data because it needs the data to be stored by the store instruction 203.

This out-of-order load/store pair is detected when the store 203 executes. The load instruction 205 and the instructions 208 (FIG. 2) issued after it are squashed and re-issued. Note that the instruction identifiers 309 previously assigned stay with the instructions after re-ordering.

Figure 4:
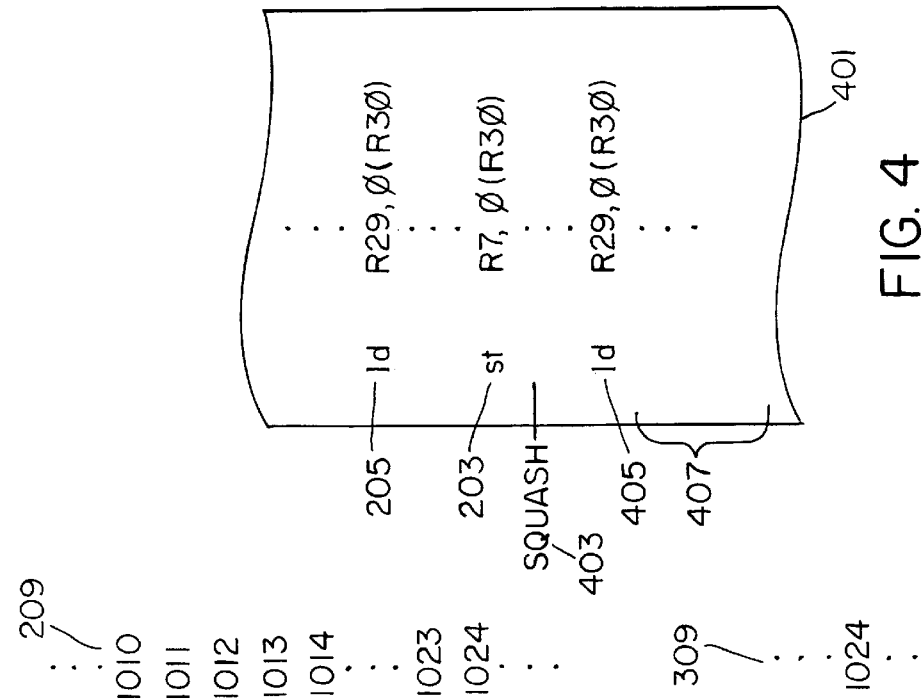
FIG. 4 is a schematic diagram illustrating the executed instruction stream of FIG. 3 before and after an instruction squash.

FIG. 4 depicts the issued instructions 401 before and after an instruction squash. The same out-of-order instructions 203, 205 shown in FIG. 3 are shown in FIG. 4. The out-of-order execution is detected as the store instruction 203 issues, and the load instruction 205 and its subsequent instructions 208 (FIG. 2) are squashed at 403. After the store 203 has executed, it is safe for the load 205 to execute and it is re-issued at 405 along with the subsequent instructions 407 corresponding to instructions 208.

Within the context of load/store memory order dependencies and instruction reissuing, the present inventions's concept of store set is based on two underlying assumptions. The first is that the historic behavior of memory-order violations is a good predictor of memory dependencies. The second is that it is beneficial to predict dependencies of loads where one load is dependent on multiple stores or multiple loads depend on the same store. The present invention provides these functions with direct-mapped structures or table which are time and space-efficient in hardware.

FIG. 5 illustrates how the store sets of the present invention are associated with dependent loads and stores in an instruction stream 451 before reordering. Loads 469 and stores 467 are identified by their program counters (PCs) 453. Each instruction 455 is shown with its corresponding program counter 453, and an indication such as M[A], for example, which represents an access to memory location A.

Each load instruction 469 is associated with a set of store instructions. For a given set of store instructions, the respective PCs of the store instructions in the set form a store set 457 of the associated load instruction 469. A load's store set 457 consists of every store PC that has caused the load to suffer a memory-order violation in the past. Assuming that the loads 469 tend to execute before the prior stores 467, causing memory-order violations, then the store sets 457 have been filled in accordingly as illustrated in FIG. 5.

In particular, the load instructions 469 indicating "load M[B]" are associated with store instruction 467 stating "store M[B]". The program counter 453 of this store instruction is PC 8 in the illustrated example. The respective store sets 459, 465 of the associated load M[B] instructions (at PC 28 and 40) thus each have an element "PC 8". Likewise, load instructions 469 "load M[C]" (at PC 36) is associated with store instructions "store M[C]" at PC 0 and PC 12. The store set 463 for that load instruction (PC 36) thus has elements "PC 0" and "PC 12". The load instruction at PC 32 has no associated store instruction and thus has an empty store set 461.

When a program begins executing, all of the loads have empty store sets 457, and the processor allows full speculation of loads around stores. For example, when load PC 36 and store PC 0, both of which access some memory address C, cause a violation by executing in the wrong order, the store's PC 0 is appended to the store set 463 of the associated load (at PC 36). If another store, e.g., PC 12, conflicts with that same load (PC 36), that store's PC is also added to the associated load's (PC 36) store set 463. The next time the processor sees that load (PC 36), the load is delayed from execution only until after execution of any recently fetched stores identified in the load's store set 463. In the depicted example, the processor executes load PC 36 only after store PC 0 or PC 12, assuming either store has been recently fetched.

When a load 469 is fetched, the processor determines which stores in the load's store set 457 where recently fetched but not yet issued, and creates a dependence upon those stores. Loads which never cause memory-order violations have no imposed memory dependencies, and execute as soon as possible. Loads which do cause memory-order violations become dependent only on those prior stores upon which they have depended in the past.

If a store PC 8 in the store set 459 of load PC 28 causes a memory-order violation with a second load PC 40, it (the store PC 8) becomes part of that load's store set 465 also.

Note that a load can have multiple store dependencies, for example, the load at PC 36 depends on the stores at PC 0 and PC 12. Furthermore, multiple loads can depend on the same store. For example, the loads at PC 28 and 40 both depend on the store at PC 8.

This situation where multiple loads depend on the same store is fairly common, occurring when there is one writer and multiple readers of a value. One load depending on multiple stores is somewhat more obscure. Three situations where this happens are:

1) a load can depend on stores from different paths, e.g.,. (if (expr) then x=a; else x=b; . . . c=x;)
2) A load can depend on multiple stores to fields of a structure packed in a data work that are all read together, e.g. (writes of the red, green and blue components of a color structure) and
3) Assuming that memory write-after-write hazards are treated as creating dependencies among a series of stores to the same location (e.g., multiple spills to the same location), a load can depend on all the stores in the series.

Since store sets 457 allow a load to be dependent on multiple stores, it would theoretically be necessary to have a mechanism that delayed the load until all the stores in the store set had executed. However, constructing such a mechanism can be expensive. It is preferable to make the load dependent on just one of those stores, yet it is not known which of the load's store dependencies will be the last to execute.

To solve this problem, in a preferred embodiment, stores indicated within a store set 457 must execute in program order. This is accomplished by making each of the stores indicated in a given store set 457, dependent on the last fetched store indicated in the store set 457. Each store specifies one dependence and each load specifies one dependent to form an in-order chain resulting in correct program behavior. By requiring that the stores indicated in a store set 457 execute in order, the present invention eliminates the need for complicated write-after-write hazard detection and data forwarding. If two sequential stores to location X are followed by a load to location X, the load effectively depends only on the second store in the sequence. Since ordering within store sets 457 is enforced, special hardware is not needed to make this distinction.

Figure 6A:
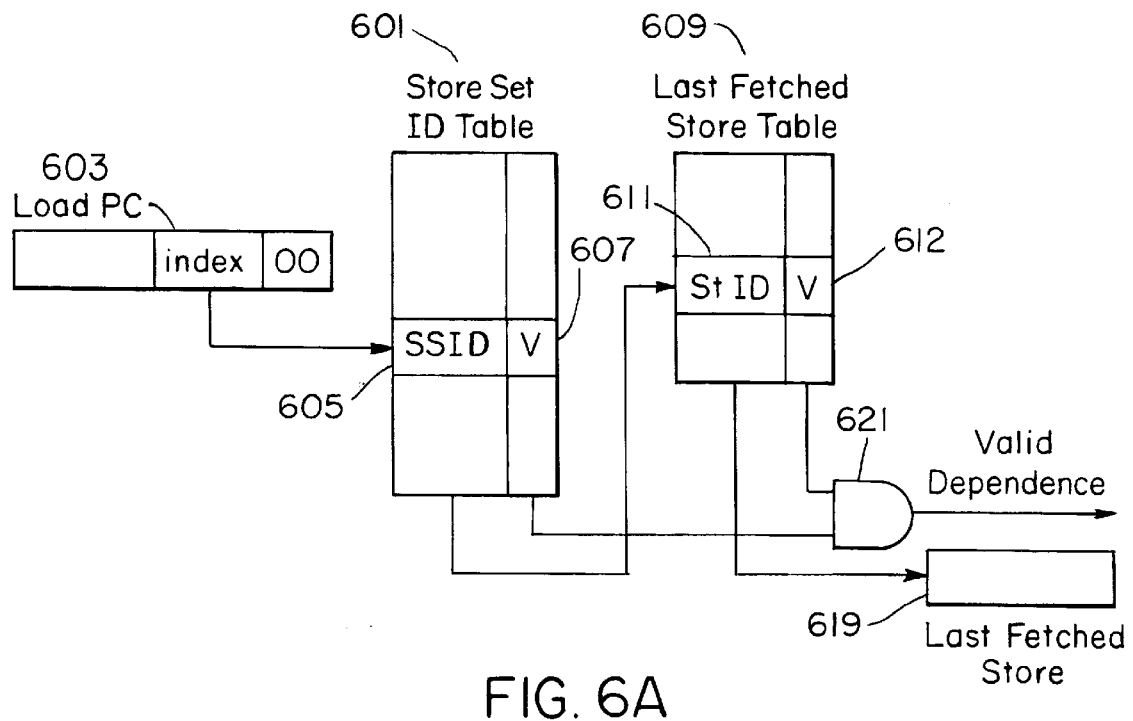
FIGS. 6A–6E are schematic diagrams illustrating the preferred embodiment of the present invention which employs two tables.

FIG. 6A is a diagram of a preferred embodiment of the present invention comprising two tables. The first is a PC-indexed table called a Store Set Identifier Table (SSIT) 601. A recently fetched load accesses the SSIT 601 based on the load's PC 603 and reads its store set identifier (SSID) 605 from the SSIT 601. If the load 603 has a valid SSID, as indicated by valid bit 607, then it has a valid store set.

The valid SSID 605 points to an entry 611 in a second table, the Last Fetched Store Table (LFST) 609. The value stored in the LFST entry 611 identifies a store instruction 619 which is part of the load's store set if the corresponding valid bit 612 is set. This store instruction 619 is the most recently fetched store instruction from the load's store set. Validity of the outputs of both tables 601, 609 is checked by an AND gate 621.

Figure 6B:
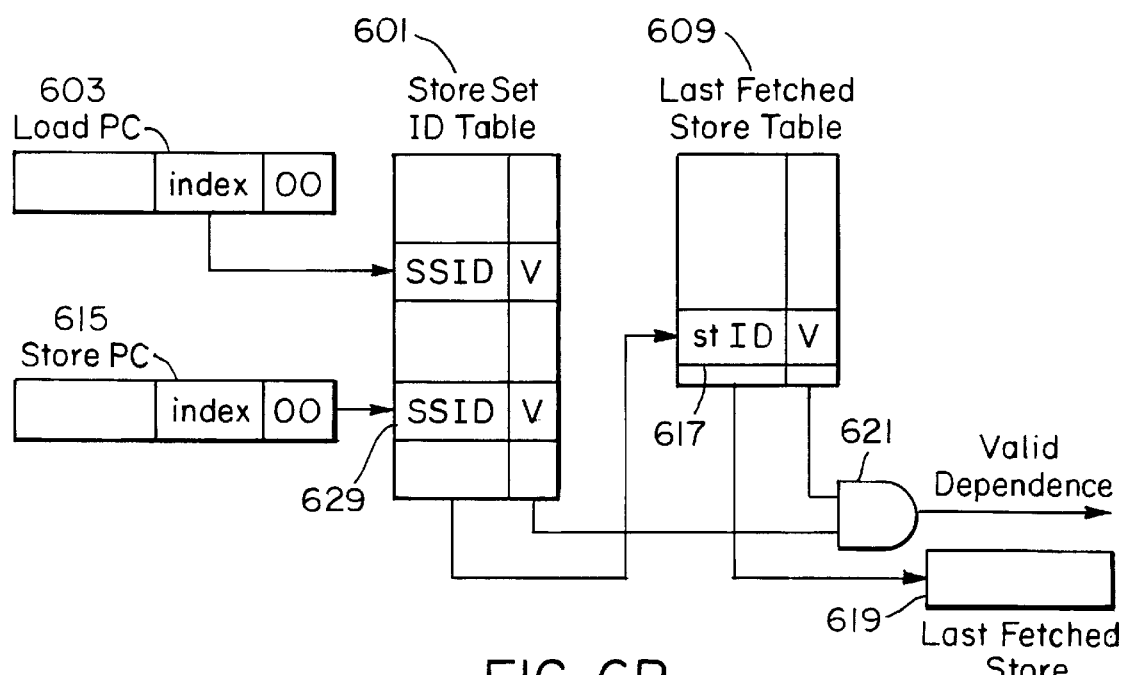

As FIG. 6B shows, a subsequently fetched store 615 also accesses the SSIT 601. If the store 615 finds a valid SSID 629, then the store 615 belongs to a valid store set of an associated load. The store 615 must then do two things. First, it accesses the LFST 609 using the valid SSID index 629 from table 601 and retrieves from LFST entry 617 a pointer (St ID) to the most recently fetched store instruction 619 in its store set. The new store 615 is made dependent upon the store 619 pointed to in the LFST 609 and informs the scheduler of this dependency. Second, the LFST 609 is updated by inserting the identifier of the new store 615 at entry 617, since it is now the last fetched store in that particular store set.

Figure 6C:
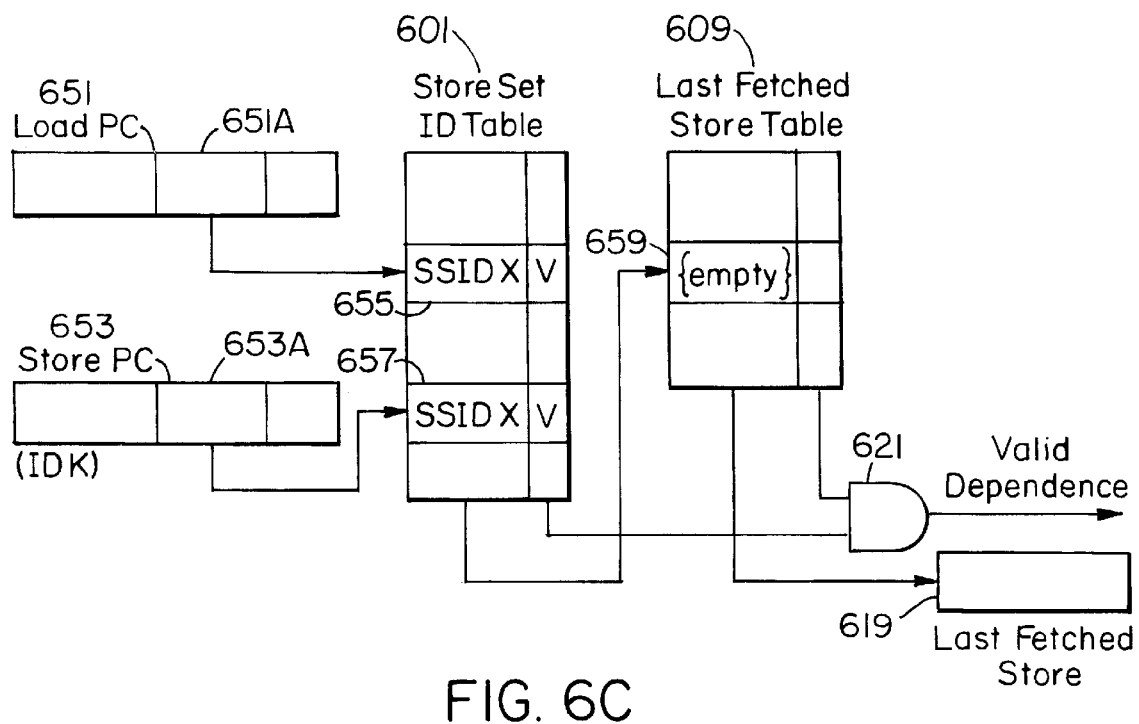

The mechanism for memory dependence prediction using these tables is shown in FIG. 6C. Assume that at the start of a program, all entries in the SSIT 601 are invalid. Initially, store and load instructions access the table 601 and get no valid memory dependence information. If a load 651 commits a memory-order violation with a store 653, a store set is created in the SSIT 601 for that load 651. The load 651 and store 653 instructions involved in the conflict are assigned a store set identifier, say SSID X. SSID X is written into two locations in the SSIT 601: the first location 655 is indexed by an index portion 651A of the load PC 651, and the second location 657 is indexed by an index portion 653A of the store PC 653.

The next time that store 653 is fetched, it reads the SSIT entry 657 indexed by the store's 653 PC. Since the store set's SSID 657 is valid, it is used to access the LFST 609 where it finds no valid entry 659 for store set X. Therefore, store 653 is not made dependent on another store.

Figure 6D:
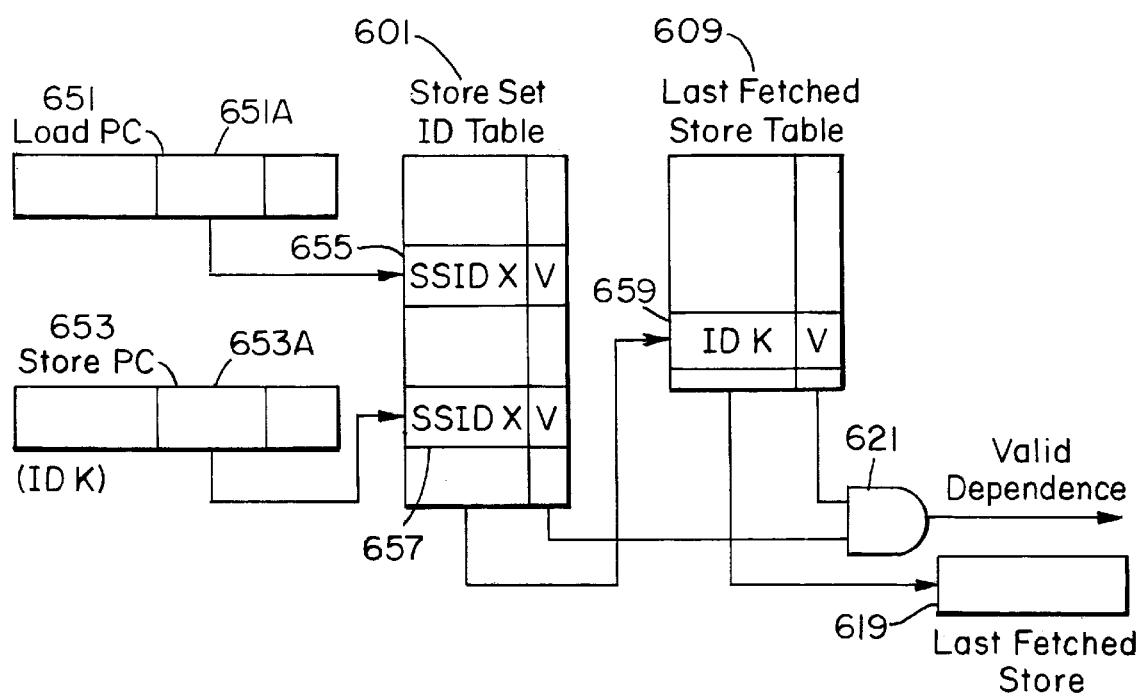

As FIG. 6D shows, the store 653 proceeds to write its own instruction instance identifier K into the LFST 609 at location 659. When the load instruction 651 is subsequently fetched, it accesses the SSIT 601, reads store set ID X from location 655 and then accesses the LFST 609 with SSID X. The LFST 609 conveys to the instruction scheduler that the load 651 is dependent upon the instruction whose identifier is indicated at the table entry 659. Thus this time, the instruction scheduler will impose a dependence between the load 651 and store 653 due to entry 659 now indicating instruction identifier K (the store's 653 instruction number).

Figure 6E:
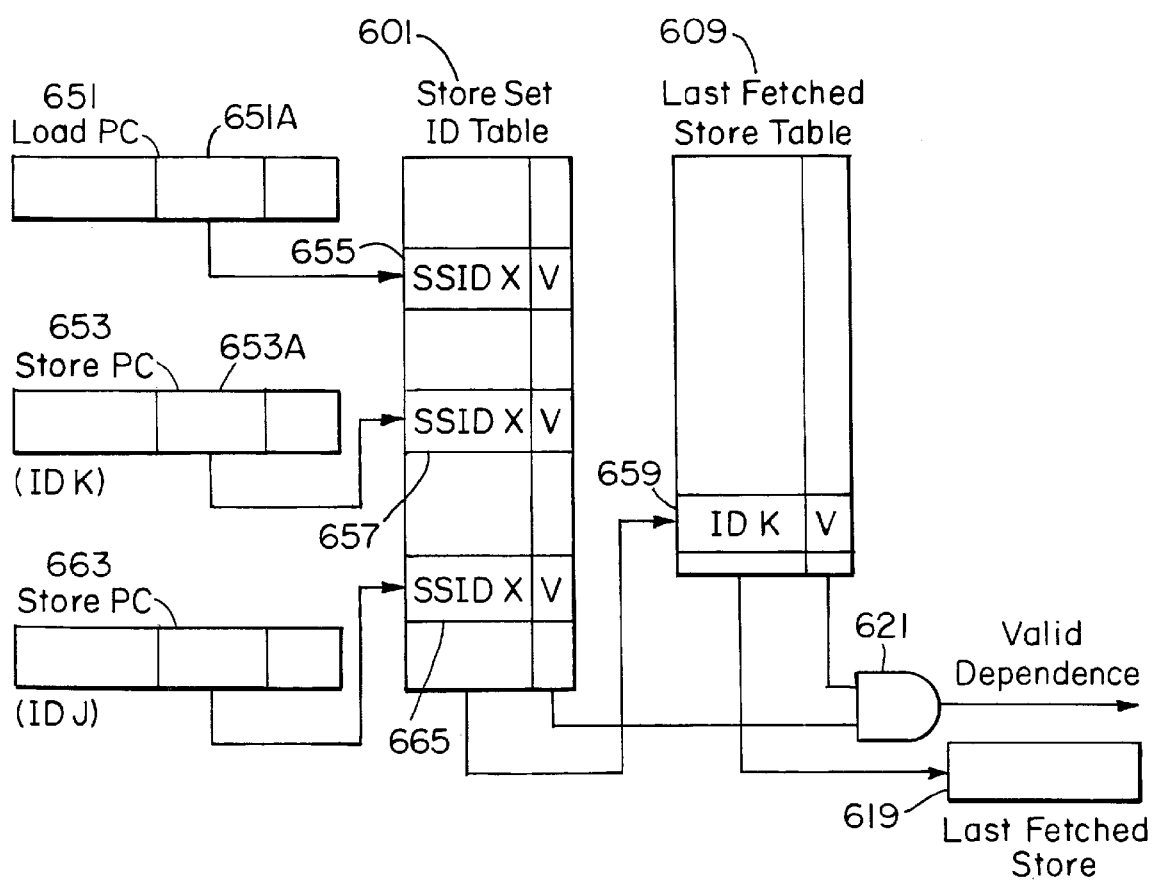

As shown in FIG. 6E, if the load 651 then conflicts with a different store 663 (having instance identifier J), the SSIT 601 is updated to reflect the new memory-order violation. SSID X is copied into the SSIT entry 665 indexed by the new store's PC 663.

Now there are three valid entries in the SSIT 601 that point to SSID X. The next time the two stores 653, 663 and the load 651 are fetched, the second fetched store 663 will depend on the first store 653, and the load 651 will depend on the second store 663. After a store instruction executes, it accesses the LFST 609 and invalidates the entry 659 if it is equal to the store's own identifier. This ensures that loads and stores are only made dependent on unexecuted stores. If the stores are from different code paths and not executed every time the load is executed, only the store that is fetched will access the SSIT 601 and modify the LFST 609. The load is always dependent on the appropriate store and the stores will never be forced to depend on each other, since they are executed at different times.

Preferably stores are constrained to be in only one store set at a time to keep the SSIT 601 and the LFST 609 simple. Alternatively, a store could be part of more than one store set if the SSIT 601 were allowed to hold more than one SSID in each entry. The multiple SSIDs would then have to access the LFST 609, increasing the number of read ports needed. Also, each load would then be dependent on up to two stores, adding more size and complexity to the instruction scheduling hardware that needs to impose dependencies.

The embodiment of FIGS. 6A–6E requires that a store be in only one store set at a time. At first this appears to violate the premise that a memory dependence predictor should allow multiple loads to be dependent on the same store. However, an algorithm using the simple hardware of FIGS. 6A–6E while retaining multiple load-store dependency functionality is now described.

When a memory-order violation occurs, entries are created in the SSIT. When neither the load's nor the store's SSID is valid, a new SSID is created and assigned to both instructions. On the other hand, if the load's SSID is valid and the store's is not, the store inherits the load's SSID, and becomes part of the load's store set as in the discussion of FIGS. 6A–E. What happens when the store already has a valid SSID different from the load's SSID has not yet been discussed. Overwriting the store's old SSID effectively removes the store from its old store set and puts the store into a new one. This is the effect of limiting a store to be in only one store set at a time. To govern the decisions made when determining whether to overwrite one valid SSID with another, the preferred embodiment establishes some store-set assignment rules.

Limiting the number of store sets to which a store can belong could create new possibilities for memory-order violations. Multiple loads may cause memory-order violations due to the same store, and since a store can only belong to one store set, a conflict can occur where the loads compete to have the store in their own store set. This can result in very poor behavior, similar to a cache thrash where two loads always cause each other to miss. The following FIGS. 7A–B are illustrative.

In FIG. 7A, two loads 701, 703 have conflicted with different respective stores in the past. Load 701 has conflicted with the three stores having PCs X, Y and Z as specified in its store set 705. Load 703 has conflicted with the two stores having PCs J and K as specified in its store set 707. Assume that store set 705 has an SSID of 1 while store set 707 has an SSID of 2. Now suppose that load 701 causes a memory-order violation when executing out of order with the store having PC J. That store PC (i.e. PC J) should then be added to the load 701's store set 705. However since a store's PC is allowed to only exist in one store set at a time, it is removed from load 703's store set 707.

The next time the second load 703 executes and conflicts with the store at PC J, the load is trapped because no memory dependence is enforced since store PC J is no longer in store set 707. It is apparent that this could result in an oscillation where the two loads 701, 703 take turns trapping and removing store PC J from the other load's store set. To avoid this destructive interference, store sets merge with each other when appropriate. To facilitate this merging, three rules are established for assigning store sets to loads and stores.

Store Set Assignment Rules:
1. When a load-store dependency has been detected by a trap due to memory ordering, if the store instruction which trapped the load is not currently in a store set, the store becomes part of the load's store set.
2. When a load has been trapped due to memory ordering, if the store instruction which trapped the load is currently part of a store set, and the load's store set is empty, the load adopts the store's store set.
3. When a load has been trapped due to memory ordering, if the store instruction which trapped the load is currently part of a store set not associated with the load, and the load's store set is not empty, one of the two store sets is declared the "winner". If the load's store set is the winner, the store trapping the load leaves its old store set and becomes part of the load's store set. If the store's store set is the winner, the load abandons its old store set, and now adopts the store's store set.

Rule 3 alludes to an arbitration algorithm that chooses a "winner" among two store sets. The arbitration algorithm should be one that, when asked to choose a winner among two specific sets, will always choose the same set.

A preferred embodiment chooses a store set based on a convergence algorithm such as a numerical comparison of SSIDs, for example, choosing the store set with the smaller store set identification number. Thus, the store sets will be merged after some constant number of traps. Of course, other converging algorithms may also be used. For example, choosing the store set with the most entries as the winner.

To understand how the store set assignment rules promote dynamic store set merging, refer again to FIGS. 7A–7C. Suppose the first load 701 causes a memory-order violation by executing before store PC J. The conditions for Rule 3 are satisfied: the store involved in the violation is already in a store set and the load's store set is non-empty. Now a "winning" store set must be declared. Assume that store set 705, having the smaller identifier is declared the winner, so that store PC J is removed from store set 707 and placed in store set 705. In the near future, load 703 causes a memory-order violation by executing before store PC J, since it has been removed from its store set 707. Again, the conditions to trigger Rule 3 exist. If store set 707 were declared the winner, the two loads 701, 703 would alternately cause memory-order violations because of store PC J. Therefore, according to Rule 3, store set 705 is selected as the winner again (where 705 is a smaller number than 707). This causes load 703 to adopt the store set 705 of the first load 701 as illustrated in FIG. 7B.

To continue, assume the second load 703 later causes a memory-order violation with store PC K, since store PC K is no longer in the load's designated store set, which is now store set 705. Store PC K is in its own store set 707 (although no load points to it), and the load's 703 current store set 705 is not empty. Again, Rule 3 specifies the winner, and once again to avoid oscillating memory-order violations, store set 705 is chosen, bringing load 703's final conflicting store (PC K) into its adopted store set 705. Now, both loads 701, 703 point to store set 705, and all the stores (PC X, Y, Z, J and K) are in store set 705, as illustrated in FIG. 7C. All further memory-order violations are avoided by this dynamic merging of store sets 705 and 707.

FIG. 8 is a schematic diagram demonstrating how unrelated loads 801, 803 having the same index values point to the same entry 805 in the SSIT 601. As a program runs, the SSIT 601 registers valid SSIDS, creating valid store sets. Every load and store instruction accesses the table 601. In FIG. 8, the two loads, one 801 that has a store set, and one 803 that does not, have a common index pointing to the same SSIT entry 805. This can have a negative impact on performance, potentially causing load-wait mispredictions for loads such as load 803 that are not in danger of committing memory-order violations.

FIG. 9 illustrates the use of tags in an alternate embodiment of the present invention to avoid the above problem. A tag field 901 is provided in the SSIT 601. When an instruction is assigned to a store set, the tag portion 903 of its PC 603 is written into the tag field 901 of the indexed entry 605. When an instruction is fetched, the index portion 905 of its PC 603 indexes into the SSIT 601 to retrieve a store set index 909, as discussed previously. In addition, the tag 907 is retrieved and compared at comparator 905 with the tag portion 903 of the PC 603. If tag 907 and tag portion 903 are equal, then the retrieved store set identifier 909 is valid for the fetched instruction, as indicated by the comparator output 907.

Finally, without a method of invalidating the SSIT 601, all of its entries will eventually become valid, randomly imposing ordering restrictions on whatever program executes in the processor. To avoid this, the valid bits 602 of the SSIT 601 are intermittently or, preferably, periodically cleared, so that the table must retrain. For example, clearing of the valid bits of the SSIT 601 at some large regular interval can be easily implemented with two counters, one that specifies a clearing interval, and the other that sweeps through the SSIT, invalidating entries. Of course, other schemes may be used to clear valid bits 602.

Alternatively, as FIGS. 10A and 10B illustrate, a counter may be appended to each SSIT 601 entry. If false dependencies are incorrectly imposed on certain loads, the counters decrement and eventually invalidate the entry, reducing the number of load-wait mispredictions. This is implemented by appending each SSIT entry with a counter as shown in FIG. 10A, preferably, but not limited to, a two-bit counter 950 having a low bit 952 and a high bit 951, as shown in FIG. 10B. When a store instruction 680 first creates its entry in the SSIT 601, the counter 950 is set to some initial value 953, preferably its maximum value. As long as some threshold is exceeded, preferably indicated by the high bit 951 of the counter 950, the instruction scheduler (not shown), which receives the indication through signal 959, enforces memory dependencies predicted by the SSIT 601 and LFST 609.

The target addresses of a predicted load/store dependence are compared to determine whether there was a load-wait misprediction in which a decision has been made to delay execution of a load based on a false assumption of dependency. If the addresses do not match, there was a load-wait misprediction, and the counter 950 associated with the store is decremented via signal 955. Otherwise the counter is incremented via signal 957. Preferably, these counters 950 are only consulted for store instructions. Of course, instead of using the high bit 951 as an indicator, a comparator may alternatively be used to compare the counter value with some threshold.

The number of store set entries needed is much smaller than the number of entries in the SSIT 601 because store sets can be more effectively shared. If two loads share one store set, it is quite possible that one load's conflicting stores and the other load's conflicting stores are never in the processor at the same time. This means that although one store set identifier is shared, temporally one load and its stores never intersect with the other load and its stores, and therefore no false dependencies are created.

A preferred embodiment of the present invention has 4K entries in the SSIT 601, 128 entries in the LFST 609, and uses cyclic clearing to invalidate the SSIT every million cycles.

A good example of the difficulty in predicting memory dependencies is found in the standard benchmark applu routines "blts" and "buts", both of which contain the following loop:

EXAMPLE 1

```
0    do ip = 1, 4
1      tmp1 = 1.0d+00 / tmat[ip, ip]
2      do m = ip+1, 5
3        tmp = tmp1 * tmat[m, ip]
4        do 1 = ip+1, 5
5          tmat[m, 1] = tmat[m, 1] – tmp * tmat[ip, 1]
6        end do
7        v(m, i, j, k) = v(m, i, j, k) – v(ip, i, i, k) * tmp
8      end do
9    end do
```

This triply nested loop creates a scenario where a load and store sometimes conflict. The problem is on line 5. The store instruction that writes tmat[m,1] and the load instruction that reads tmat[ip,1] will sometimes conflict. To see this more clearly, the problem can be reduced to:

EXAMPLE 2

```
do ip = 1, 4
  do m = ip+1, 5
    do l = ip+1, 5
      load tmat[ip, 1]      ; PC A
      store tmat[m 1]       ; PC B
    end do
  end do
end do
```

Multiple iterations of the loop are in-flight simultaneously in the processor, so that multiple instances of the load and store PC are in-flight at the same time. Consider a point in the loop execution when ip equals 3. The inner loops will produce this sequence of the load and store PCS:

EXAMPLE 3

```
PC
A   load tmat (3,4) ip=3, m=4, 1=4 - iter V
B   store tmat (4,4)
A   load tmat (3,5) ip=3, m=4, 1=5 - iter W
B   store tmat (4,5)
A   load tmat (3,4) ip=3, m=5, 1=4 - iter X
B   store tmat (5,4)
A   load tmat (3,5) ip=3, m=5, 1=5 - iter Y
B   store tmat (5,5)
A   load tmat (4,5) ip=4, m=5, 1=5 - iter Z
B   store tmat (5,5)
```

Here the load in iteration Z is dependent on the store in iteration W. When those two instructions execute out of order they cause a memory-order violation, and the store at PC B becomes a member of the load's store set. This is unfortunate, because the load will always wait for the most recent iteration of the store before executing. So, the next time this triply nested loop is executed, the second iteration load will wait for the first iteration store, the third iteration load will wait for the second iteration store and so on. Yet, only certain iterations of the load are actually dependent on certain iterations of the store. The preferred store set implementation does not keep track of iteration information. Most of the parallelism in the loop is serialized in hardware, resulting in a severe performance degradation for this loop.

To eliminate this problem, a compiler could fully unroll the triply nested loop. This would create separate PCs for the loads and stores in different iterations. Then the store set memory dependence predictor would allow a load to specify which specific store conflicts with it.

When the CPU recovers from a misspeculation (branch mispredict, jump mispredict, or memory-order violation) the SSIT does not need to be modified. Ideally, the LFST rolls back each entry to the last live store which wrote that entry. Alternatively, simply invalidating aborted store entries in the table is sufficient. As a third, simpler alternative, all store entries in the LFST are invalidated.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, although the focus is on memory dependence prediction, the present invention could be extended to propagate data values from stores to dependent loads to increase performance further.

In addition, the present invention can be used to predict non-memory-based dependencies such as register dependencies and the like.

Furthermore, the present invention may also be used to represent sets of items in a direct-mapped table. Other similar uses are in the purview of one skilled in the art based on the foregoing disclosure.

What is claimed is:

1. A method of scheduling program instructions for execution in a computer processor, comprising:
   fetching instructions from an instruction memory and holding them, certain fetched instructions being load instructions (loads) and causing load operations, and other fetched instructions being store instructions (stores) and causing store operations;
   executing the fetched instructions out of program order;
   detecting a load/store order violation wherein a load executes prior to a store on whose data the load depends, and upon such detection:
     erasing the effect of and re-executing the load and its dependent instructions, and
     associating the load with the store on whose data the load depends by adding the store to an existing store set associated with the load, and if no such store set exists,
     creating a store set for the load, and
     adding the store to the store set; and
   on a subsequent issuance of the load, delaying its execution until any store associated with a previously-fetched instruction which has been associated with the load, has executed.

2. The method of claim 1, further comprising:
   detecting a subsequent load/store order violation between the load and a respective subsequent store on whose data the load depends, and upon such detection:
   re-executing the load; and
   adding the respective subsequent store to the load's store set.

3. The method of claim 2 wherein subsequent store includes plural subsequent stores.

4. The method of claim 3, further comprising:
   detecting a subsequent load/store order violation between a respective subsequent load and a store on whose data the respective subsequent load depends, wherein the store has already been added to a first load's store set, and upon such detection:
   re-executing the respective subsequent load and its dependent instructions, and
   adding the respective subsequent load to the first load's store set; and
   merging, if the respective subsequent load has a non-empty store set, its store set with the first load's store set.

5. The method of claim 4 wherein subsequent load includes plural subsequent loads.

6. The method of claim 5, wherein merging further comprises:
   declaring either the respective subsequent load's store set or the first load's store set a winner; and if the respective subsequent load's store set has been declared the winner, removing the store from the first load's store set and adding the store to the respective subsequent load's store set, or if the first load instruction's store set has been declared the winner, removing the respective subsequent load from its store set and adding the respective subsequent load to the first load's store set.

7. The method of claim 6, wherein every store set is assigned a unique store set identifier (SSID), and a store set with fewer instructions is declared the winner.

8. The method of claim 6, wherein every store set is assigned a unique store set identifier (SSID), and a numerical comparison of SSIDs is used to declare the winner.

9. The method of claim 8, wherein a store set with a lower SSID is declared the winner.

10. The method of claim 5 wherein stores within a store set must execute in fetched order.

11. The method of claim 5 wherein stores and loads within a store set must execute in fetched order.

12. The method of claim 5, further comprising:
assigning a unique store set identifier (SSID) to each store set;
providing a first table for storing SSIDs at locations indexed by an index which is based on respective load and store instruction program counters (PC);
providing a second table for storing an instruction identifier at a location indexed by a SSID, the instruction identifier identifying the last fetched store instruction with respect to the store set identified by the SSID; and
delaying execution of any instruction under consideration if said instruction is associated with a SSID whose respective entry in the second table is a last fetched store instruction associated with the SSID, until said last fetched store instruction has executed.

13. The method of claim 12, further comprising:
eventually executing an instruction under consideration if said instruction is associated with a SSID whose respective entry in the second table identifies the said instruction, and invalidating the corresponding entry in the second table.

14. The method of claim 13 wherein the index for the first table comprises part of an instruction PC.

15. The method of claim 13 wherein the index for the first table comprises a hash of an instruction PC.

16. The method of claim 13 wherein the first table is intermittently invalidated.

17. The method of claim 13 wherein the first table is cyclically invalidated.

18. The method of claim 13 wherein a tag portion of one of a load and store PC is saved in the first table, such that when one of the load and store is later fetched, its tag portion is compared with the tag saved in the first table, and if they are equal, the entry in the first table is valid.

19. The method of claim 5, further comprising:
associating a counter with each store;
setting a counter to a predetermined value when a load/store violation occurs involving the associated store instruction;
determining whether a real dependence exists on a subsequent non-reordered issuance of the store instruction, and if real dependence is nonexistent, decrementing the associated counter, and otherwise incrementing the associated counter; and
removing the store instruction from the load instruction's store set if the associated counter's value is less than a predetermined threshold.

20. The method of claim 19 wherein a counter is decremented by one when it is determined that real dependence is nonexistent, but the counter is maintained nonnegative, and the counter is incremented by one when it is determined that real dependence does exist, but the counter is maintained below a predetermined maximum value.

21. A system for scheduling program instructions for execution in a computer processor, comprising:
an instruction fetcher which fetches instructions from an instruction memory and holds them in an instruction queue, certain fetched instructions being load instructions (loads) and causing load operations, and other fetched instructions being store instructions (stores) and causing store operations, and the instruction queue executing the fetched instructions out of program order;
means for detecting a load/store order violation wherein a load executes prior to a store on whose data the load depends, such that upon such detection:
the effect of the load and its dependent instructions is erased and the load and its dependent instructions are re-executed, and
the load is associated with the store on whose data the load depends, wherein the store is added to an existing store set associated with the load, and if no such store set exists, a store set is created for the load and the store is added to the store set; and
means for delaying, on a subsequent or issuance of the load, its execution until any store associated with a previously-fetched instruction has executed, the previously-fetched instruction having been associated with the load.

22. The system of claim 21, wherein upon a subsequent detection of a load/store order violation between the load and a respective subsequent store on whose data the load depends, the load is re-executed, and the respective subsequent store is added to the load's store set.

23. The system of claim 22 wherein subsequent store includes plural subsequent stores.

24. The system of claim 23, further comprising:
means for detecting a subsequent load/store order violation between a respective subsequent load and a store on whose data the respective subsequent load depends, wherein the store has already been added to a first load's store set, wherein upon such detection:
the respective subsequent load and its dependent instructions are re-executed; and
the respective subsequent load is added to the first load's store set, and if the respective subsequent load has a non-empty store set, its store set is merged with the first load's store set.

25. The system of claim 24 wherein subsequent load includes plural subsequent loads.

26. The system of claim 25, wherein one of the respective subsequent load's store set and the first load's store set is declared a winner, and wherein if the respective subsequent load's store set has been declared the winner, the store is removed from the first load's store set and the store is added to the respective subsequent load's store set, or if the first load's store set has been declared the winner, the respective subsequent load is removed from its store set and the respective subsequent load is added to the first load's store set.

27. The system of claim 26, wherein every store set is assigned a unique store set identifier (SSID), and a store set with fewer instructions is declared the winner.

28. The system of claim 26, wherein every store set is assigned a unique store set identifier (SSID), and a numerical comparison of SSIDs is used to declare the winner.

29. The system of claim 28, wherein a store set with a lower SSID is declared the winner.

30. The system of claim 25 wherein stores within a store set are executed in fetched order.

31. The system of claim 25 wherein stores and loads within a store set are executed in fetched order.

32. The system of claim 25, further comprising:
- a first table in which SSIDs are stored at locations indexed by an index which is based on respective load and store instruction program counters (PC); and
- a second table in which an instruction identifier is stored at a location indexed by a SSID, the instruction identifier being the last fetched store instruction with respect to the store set identified by the SSID, such that execution of any instruction under consideration is delayed if said instruction is associated with a SSID whose respective entry in the second table is a last fetched store instruction associated with the SSID, which is yet unexecuted.

33. The system of claim 32, wherein
- an instruction under consideration is eventually executed if said instruction is associated with a SSID whose respective entry in the second table is the said instruction, after which the corresponding entry in the second table is invalidated.

34. The system of claim 33 wherein the index for the first table comprises part of an instruction PC.

35. The system of claim 33 wherein the index for the first table comprises a hash of an instruction PC.

36. The system of claim 33 wherein the first table is intermittently invalidated.

37. The system of claim 33 wherein the first table is cyclically invalidated.

38. The system of claim 33 wherein a tag portion of a load or store PC is saved in the first table, such that when the load or store is later fetched, its tag portion is compared with the tag saved in the first table, and if they are equal, the entry in the first table is valid.

39. A method of representing sets of items in a computer processor, comprising:
- associating an item with an existing set, and if no appropriate set exists,
  - creating a set for the item, and
  - associating the item with the set;
- assigning a unique set identifier (SID) to each set; and
- providing a table for storing SIDs at locations indexed by an index which is based on the item.

* * * * *